United States Patent [19]
Weimer et al.

[11] 3,744,002
[45] July 3, 1973

[54] BUS DUCT WITH PLUG-IN UNIT FOR CLOSELY SPACED BUS BARS

[75] Inventors: Charles L. Weimer, Patterson Heights; Montgomery T. Popovich, Beaver Falls, both of Pa.

[73] Assignee: Westinghouse Electric Corporation, Pittsburgh, Pa.

[22] Filed: June 30, 1972

[21] Appl. No.: 267,813

[52] U.S. Cl.................................. 339/22B, 174/71 B,
[51] Int. Cl................................................. H02G 5/02
[58] Field of Search ................. 339/22 B; 174/71 B, 174/68 B

[56] References Cited
UNITED STATES PATENTS

| | | | |
|---|---|---|---|
| 3,384,856 | 5/1968 | Fisher | 339/22 B |
| 3,439,309 | 4/1969 | Giger et al. | 339/22 B |
| 3,482,202 | 12/1969 | Wallace et al. | 339/22 B |

Primary Examiner—James D. Trammell
Attorney—A. T. Stratton et al.

[57] ABSTRACT

A section of bus duct with plug-in power take-off outlets in which there are a set of a plurality of elongated unitary bus bars having a pair of opposite wide faces and a pair of opposite narrow faces, the bus bars being insulated and disposed in surface-to-surface compact relationship within an elongated housing in which there is at least one opening in the housinb side facing the narrow faces of the bus bar, which opening is adapted for use with a plug-in element, the plug-in element having a plurality of pairs of spaced stabs engageable with an uninsulated edge portion of a corresponding bus bar, and the bus bars on opposite sides of the uninsulated portion of bus bar having notches adapted to receive the spaced stabs engageable with said uninsulated portion.

6 Claims, 6 Drawing Figures

BUS DUCT WITH PLUG-IN UNIT FOR CLOSELY SPACED BUS BARS

BACKGROUND OF THE INVENTION

1. Field Of The Invention

This invention relates to a bus duct having power take-off stabs engageable in the edge-wise direction with regard to the bus bars.

2. Description Of The Prior Art

Bus ducts of various types are disclosed in U.S. Pat. No. 3,459,872, 3,444,311, and 3,384,856 in which a plurality of bus bars are sandwiched between opposite housing members in compact relationship with each other to facilitate heat dissipation. The latter patent also discloses power take-off members in the edge-wise direction with regard to the bus bars.

Bus bars having large flat surfaces against the housing for transferring heat outside the duct are not readily adapted to conventional power take-off units. A difficulty with power take-off units in the edge-wise direction of bus bars has been the close spacing between the bus bars. Inasmuch as each bus bar is provided with an insulation coating, the spacing between juxtaposed surfaces of adjacent bus bars has been approximately one-sixteenth inch. For that reason no practical method for attaching to the bus bars edge-wise has been considered, except by separating the bars at spaced intervals for the attachment of power take-off units.

As is well known in the art it is desirable to maintain the bus bars close together in order to obtain the advantage of lower impedance and therefore a lower voltage drop throughout the length of the bus bars. Accordingly, there has been a need for a power take-off unit from the edges of the closely spaced bus bars which does not raise the impedance and increase the voltage.

SUMMARY OF THE INVENTION

It has been found in accordance with this invention that some of the difficulties encountered in the prior art may be overcome by providing a bus duct section comprising a set of a plurality of elongated unitary bus bars having a pair of opposite wide side surfaces and a pair of opposite narrow edge surfaces, the bars being separately electrically insulated and disposed in surface-to-surface contact relationship, a plug-in element having a set of pairs of spaced stabs, each bus bar having an electrically uninsulated portion aligned with a corresponding pair of stabs, the stabs engaging opposite sides of the uninsulated portions, and each bus bar on the opposite sides of each uninsulated portion having a notch adapted to receive one of the stabs of each pair of stabs.

The advantage of the bus bar section of this invention is that the notches in the bus bars provide physical clearance for the stabs, thereby enabling the use of closely packed bus bars which in turn involve lower impedance and lower voltage drop characteristics.

DESCRIPTION OF THE PREFERRED EMBODIMENTS

Figure 1:
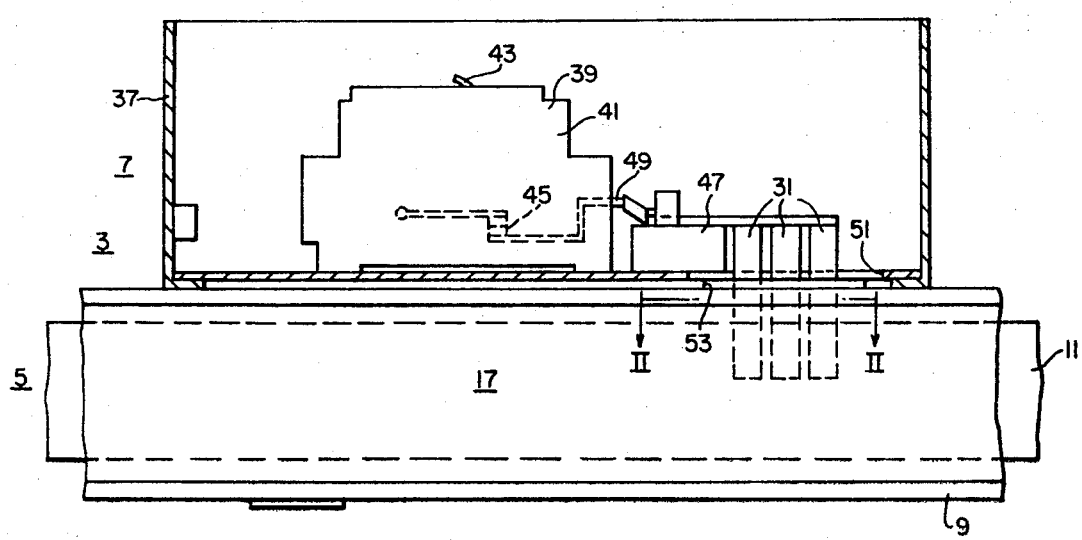
FIG. 1 is a side view, partly in section and partly in elevation, of a part of a bus duct embodying the principles of this invention.

In FIG. 1 there is shown bus duct apparatus 3 comprising a section of bus duct 5 and a plug-in unit 7 mounted on the section of bus duct. The section 5 comprises a housing 9 and four bus bars 11 supported in the housing.

The bus duct housing 9 is of the four-channel interlocking type of construction. The channel 9 includes two generally channel-shaped parallel side members 17 and two generally channel-shaped parallel edge members 19 (FIG. 4) which members are interfitting and secured together in a suitable manner, such as spot welding. The particular configuration of the end portions of the members 17 and 19 may be of any other suitable interfitting configuration, such as shown in the above-mentioned U.S. Pat. No. 3,459,872 and is not relative to the crux of this invention.

The bus bars 11 comprise three phase conductors 11a, 11b, and 11c (FIG. 2) and an optional neutral bar 11d. A ground conductor 15 may also be provided. The bars 11 and the ground conductor 15 are supported within the housing 9 and are separated from each other by insulating sleeve means 21.

The plug-in unit 7 comprises a metal housing 37 having a removable or openable cover (not shown). A circuit interrupter 39, which may be an automatic circuit breaker or switch, is mounted inside the housing 37. The circuit interrupter comprises an insulating housing 41, having an operating handle 43 extending from the front thereof. The handle 43 is movable between two positions to open and close three pairs of contacts 45 (only one of which pair is shown in broken-line in FIG. 1) in a manner well known in the art. The circuit interrupter may be a circuit breaker of the type described in U.S. Pat. No. 3,103,565, issued Sept. 10, 1963 to E. J. Walker et al. An insulating support 47 is mounted in the housing 37 opposite one end of the circuit breaker 39, and plug-in type contact structures or stabs 31 depend from a conductor 33 mounted on the support 47. The minimum number of stabs 31 is three. A fourth stab for neutral and a fifth stab for ground are optional. A separate conductor 49 electrically connects each of the stabs 31 with one of the pairs of contacts 45 within the circuit breaker 39. An opening 51 is provided in the base of the housing 37 through which the stabs 31 extend as well as through an opening 53 aligned with the opening 51.

Figure 4:
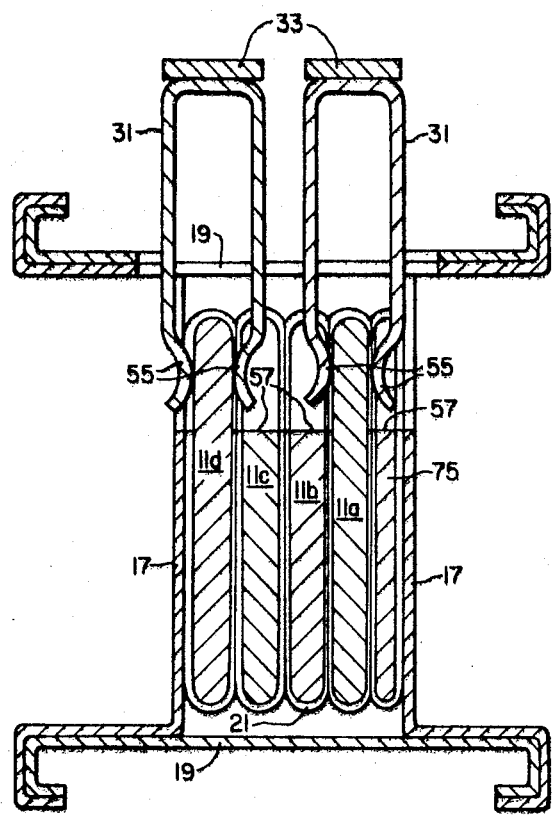
FIG. 4 is a vertical sectional view taken on the line IV—IV of FIG. 2.

As shown in FIG. 4 the contact structures or stabs 31 are U-shaped members having a pair of similar U-legs, the lower ends 55 of which engage opposite sides of the bus bars 11. In order to provide for electrical contact between the stabs and the bus bars the edge portions are uncoated by the insulating sleeve means 21.

Figure 2:
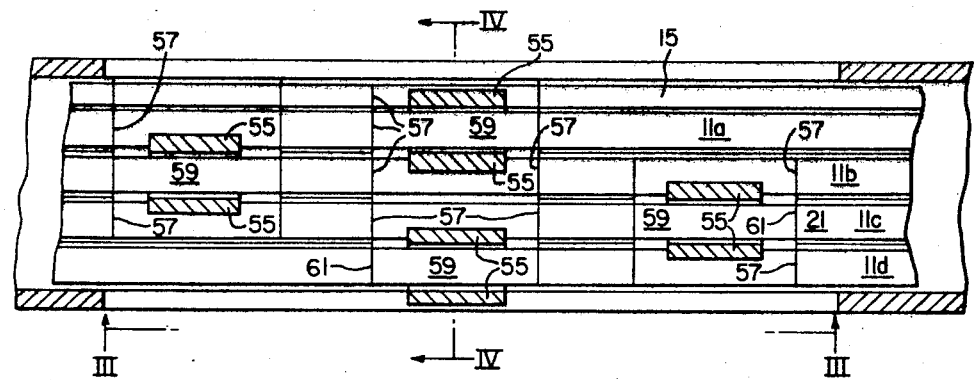
FIG. 2 is a horizontal sectional view taken on the line II—II of FIG. 1.
Figure 3:
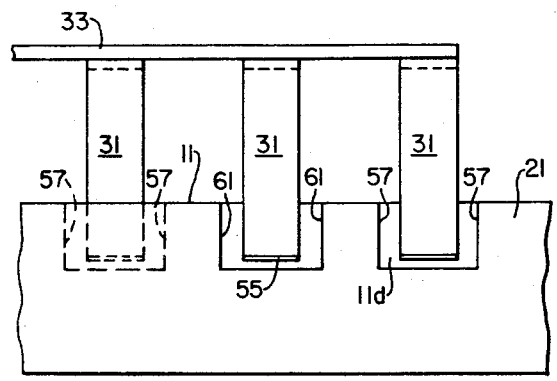
FIG. 3 is a horizontal sectional view taken on the line III—III of FIG. 2.

In accordance with this invention, inasmuch as the spacing between the closely backed bus bars 11 is less than the thickness of the coatings of adjacent bus bars, the portions of the bus bars next adjacent to the particular bus bar engaged by the stabs is cut-away or provided with a notch 57. The ground conductor 15 is similarly provided with a notch 57. In FIGS. 2 and 3 the manner in which the adjacent bus bars 11 and ground conductor 15 are notched at 57 is shown. Moreover, uninsulated or exposed portions 59 are shown disposed between each pair of lower ends 55 of each leg 31, each uninsulated portion 59 being disposed between edges 61 of insulating sleeve means 21. Thus, the notches 57 in the bus bars 11 on opposite sides of each uninsulated portion 59 of a bus bar engaged by the stabs 31 provide clearance for the acceptance of the lower ends 55 of each pair of stabs. In that manner the bus bars are maintained in their surface-to-surface compact relationship and thereby maintain the advantages of this relationship, instead of flaring the bus bars at spaced intervals in order to provide spaces therebetween to accommodate stabs or associated connecting means. Briefly, the notches 57 in the bus bars 11 provide for the physical clearance for the stabs. Finally, by arranging the stabs in a pattern corresponding to the locations of the uninsulated portions 59 the stabs serve as part of the plug-in unit 7.

Figure 5:
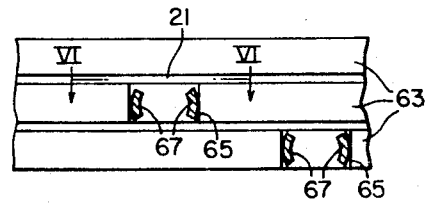
FIG. 5 is a vertical sectional view showing another embodiment of the invention.
Figure 6:
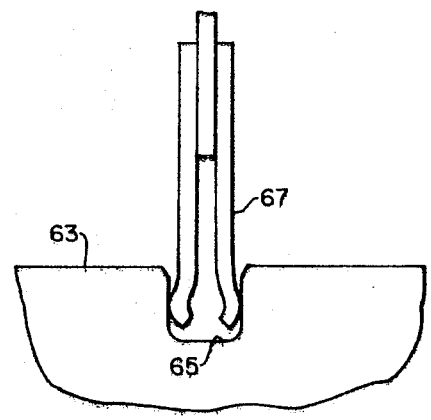
FIG. 6 is a horizontal sectional view taken on the line VI—VI of FIG. 5.

Another embodiment of the invention is shown in FIGS. 5 and 6 in which a plurality of surface-to-surface compact bus bars 63 are provided in a manner similar to that shown in FIGS. 1-4. Each bus bar 63 is provided with insulating sleeve means 21 in a manner similar to the means 21 on the bus bars 11. The embodiment shown in FIGS. 5 and 6 differs from that shown in FIGS. 1-4 in that each bus bar 63 is provided with a stab-receiving notch 65 into which the lower ends of the legs of a stab 67 are inserted for electrical contact with the wall portions of the bus bar 63 forming the notch 65. Adjacent portions of bus bars 63 on opposite sides of the notch include the insulating sleeve means 21 and thereby confine contact of the legs of the stab 67 to the surfaces of the notch 65 of the particular bus bar 63 involved.

Accordingly, the device of the present invention provides for a plug-in unit for a section of bus duct in which the bus bars are maintained in surface-to-surface compact relationship, thereby maintaining the same low impedance and bar size as a feeder duct. Moreover, the bus bars are electrically insulated over their entire length except at the stab contact points with a suitable insulating material such as epoxy resin which is applied preferably by the fluidized bed process. Finally, the series of notches included in the bus bars provide for the physical room for the stabs to make contact with the bus bar adjacent to the notch, thereby maintaining an insulating barrier for electrical clearances between the closely spaced stabs.

What is claimed is:

1. A section of bus duct with power take-off means, comprising an elongated housing, a plurality of elongated bus bars within the housing, the bus bars being separately insulated and disposed in surface-to-surface compact relationship, each bus bar comprising a pair of opposite wide side surfaces and a pair of opposite narrow edge surfaces, a plug-in element having a set of pairs of spaced stabs, each pair of stabs being engaged with a separate bus bar, and the bus bars having having notch means for receiving the stabs.

2. The section of bus duct of claim 1 in which the housing includes at least one plug-in region along the length thereof, each bus bar having an uninsulated portion aligned with the plug-in region, and the spaced stabs engaging opposite sides of the uninsulated portions of the bus bars.

3. The section of bus duct of claim 2 in which the notch means comprise a notch in each bus bar on the opposite sides of each uninsulated portion of the bus bars.

4. The section of bus duct of claim 3 in which the uninsulated portion of each bus bar is longitudinally spaced from that of another bus bar.

5. The section of bus duct of claim 4 in which each pair of spaced stabs is aligned with the uninsulated portion of a corresponding bus bar, one spaced stab extending into the notch on one side of the bus bar, and the other stab extending into the notch on the other side of the bus bar.

6. The section of bus duct of claim 1 in which each pair of spaced stabs extend into a notch of a corresponding bus bar and engage the walls of the bus bar forming the notch.

* * * * *